United States Patent [19]

Hansen

[11] Patent Number: 4,875,304

[45] Date of Patent: Oct. 24, 1989

[54] THUMB CONTROLLED FISHING LINE, CASTING DEVICE

[76] Inventor: Arthur J. Hansen, 34 Charles St., B-4, Westwood, N.J. 07675

[21] Appl. No.: 329,443

[22] Filed: Mar. 28, 1989

[51] Int. Cl.[4] ............................................. A01K 87/00
[52] U.S. Cl. ...................................................... 43/25
[58] Field of Search ........................... 43/22, 23, 24, 25

[56] References Cited

U.S. PATENT DOCUMENTS

| | | | |
|---|---|---|---|
| 2,761,237 | 11/1954 | Piaja | 43/25 |
| 2,810,982 | 7/1956 | Bucciarelli | 43/25 |
| 3,045,380 | 11/1960 | Meredith | 43/25 |
| 3,053,004 | 11/1960 | Baker | 43/25 |
| 3,222,813 | 11/1961 | Buckeridge | 43/25 |
| 3,256,633 | 8/1964 | Smith | 43/25 |
| 4,730,409 | 3/1988 | Mitchell et al. | 43/25 |

Primary Examiner—Nicholas P. Godici
Assistant Examiner—Michael William Starkweather

[57] ABSTRACT

A device consisting of a ridge above a concave shaped material FIG. 1 formed in one piece by the injection moulding process. It is attached to or moulded into the foregrip 32 of a fishing rod 44 designed to use a spinning reel 34 for casting weights. The ridge 22 is high in the front 2 and tapers to the edge of the right side 18, left side 20 and rear side 16, FIG. 3. There is flexibility on the right side and the left side of the device to allow expansion sufficient enough to permit its use on foregrips of varying diameters. The surface of the device is smooth to the touch.

1 Claim, 1 Drawing Sheet

THUMB CONTROLLED FISHING LINE, CASTING DEVICE

BACKGROUND

1. Field of Invention

This invention relates to fishing tackle used by sports fishermen, especially to Spinning Rods used for casting with Spinning Reels, to provide for safer, easier and more efficient casting.

2. Description of Prior Art

I, the inventor, have been an ardent Sport Fisherman, Fishing Guide and Tournament Games Caster of note with fishing tackle for more than forty years. I am well versed in the make and use of such equipment.

Heretofore, when Spinning Rods and Reels were developed for sport fishing, the casting method taught and described in accompanying literature was to hold the fishing line with the forefinger which then released the line upon making the cast. However, for more than thirty years I have cast by holding the line under my thumb after it was placed over the fishing rod foregrip, FIG. 5. Other than those persons I chose to teach this method of casting to, I have rarely seen others use it. I have fished with, cast with and met thousands of knowledgable, experienced fishermen but rarely told others about my casting proceedure for competitive reasons.

I have now developed this invention to improve on the using of the thumb for casting with Spinning Rods and Reels. Most spinning rod and reel users, therefore, would find it desirable to have a device placed on or implanted into the foregrip of their spinning rods which would provide for safer, easier and more efficient casting with the thumb.

OBJECTS AND ADVANTAGES

Accordingly the objects and advantages of the invention are to provide a device which is smooth on it's surface so as to prevent wear of the fishing line and allow the fishing line to slip away easily when thumb pressure is released. This device is tapered to conform more appropriately with the thumb angle and thereby allow more pressure to be applied when holding the line. Also, this device will properly identify where the line should be placed when thumb casting, thereby avoiding the possibility of the line catching on the end of, or catch in a crevice within, the foregrip thereby eliminating a snag which could cause the line to break or cause the weight being cast to swing back at the caster. Finally, this device which, because of the increased thumb pressure possible, will enable the casting of heavier weights than possible when casting without the device.

In addition, the following additional objects and advantages result from this device:

To provide a device which is easily manufactured using injection moulding techniques, which is low in cost as it can be made of plastics, which enables children and others to learn casting with spinning rods and reels more easily and safely, and which is sufficiently flexible in its construction so as to fit easily and simply in or on the most common foregrip diameters of spinning rods.

Readers will find further objects and advantages of the invention from a consideration of the ensuing description and the accompanying drawings.

DRAWING FIGURES

DESCRIPTION

Figure 2:
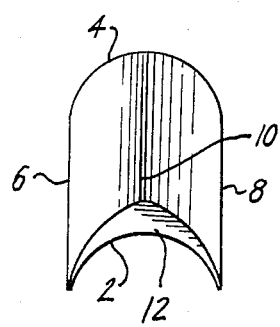
FIG. 2 shows a front and top view of the one piece device.
Figure 3:
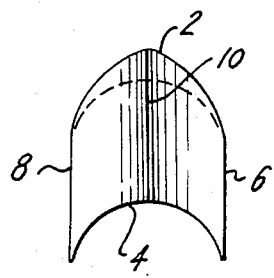
FIG. 3 shows the rear and top view of the one piece device with tapering of the ridge to the right, left and rear sides.
Figure 4:
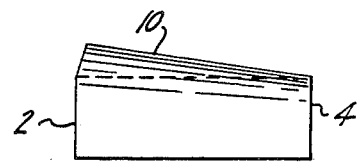
FIG. 4 shows the side view of the one piece device.

FIG. 2 shows a single piece device according to the preferred embodiment of the invention. The device comprises a half circle concave shape 2 on the underside and a raised area 12 on the upper front side which slopes to meet the rear 4, right 8 and left 6 side edges, as shown in FIG. 2, thereby forming a ridge 10 on the top side. The device is preferably created by the injection moulding process and made with a type of plastic, ie: Nylon.

The single piece device is made to be attached to, or moulded into, the foregrip 32 on a fishing rod 44 designed to use a spinning reel 34. It can be attached to the foregrip with waterproof glue. The device can also be moulded into the foregrip at the time when the foregrip is manufactured.

Figure 1:
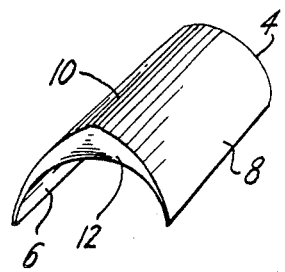
FIG. 1 shows a perspective front, top and side view of a one piece device according to the invention.

Alternate physical forms of the device FIG. 1 may include a device which may be longer or shorter, wider or narrower, and, in the ridge area 10 higher or lower, wider or narrower and should not be limited to the particular size of form shown FIG. 1, FIG. 2, FIG. 3, FIG. 4.

OPERATION

The single piece device FIG. 1 will serve several purposes for the spinning rod and reel users who employ the thumb casting method, including eliminating wear on fishing line and fishing line hangups, a smooth fishing line release, a proper place to put the fishing line when casting, enables the user to cast heavier weights, etc.

Figure 5:
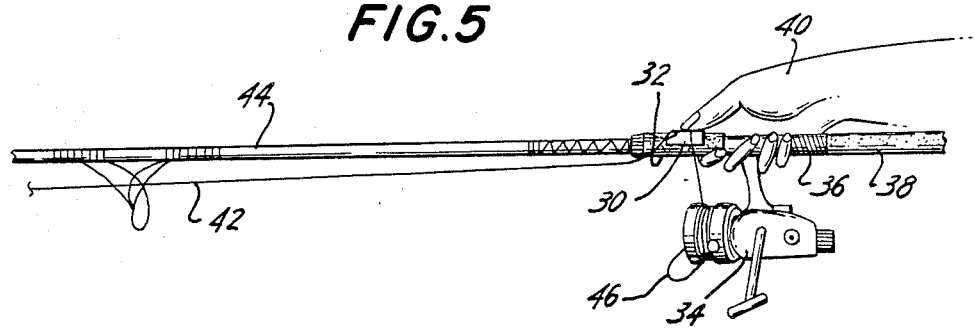
FIG. 5 shows a view of the one piece device in use, placed on a spinning rod as relative to the thumb casting proceedure.

The proceedure of casting a spinning rod 44 and spinning reel 34 after the single piece device is placed on the rear of the foregrip 32 top side is simple. The fishing rod and reel is held as shown FIG. 5. The bail 46 is opened to release the line 42 which is then placed over the device 30 and held in place with the thumb. The fisherman is now ready to cast and does so by letting the line slip out from under the thumb during the forward thrust in casting a weight.

I claim:

1. A combination fishing rod, fishing reel, fishing line, and a thumb controlled casting means comprising:
    a fishing rod, reel, and line mounted thereon;
    a thumb controlled fishing line casting means comprising: a tubular means having a longitudinal opening along a bottom portion for mounting snugly upon a foregrip of said fishing rod;
    said casting means further comprising:
    a ridge portion running longitudinally from a raised position, at one end of said casting means top portion, to a lowered position at one other end;
    whereby, said casting means mounted on said foregrip said rod is operated by: first, placing said line along said ridge and placing ones thumb upon said ridge and line, and second, casting said rod wherein said line will slide out from under ones thumb and thus releasing said line from said thumb controlled casting means.

* * * * *